United States Patent [19]

Akiyama

[11] Patent Number: 5,124,922
[45] Date of Patent: Jun. 23, 1992

[54] SYSTEM AND METHOD FOR CONTROLLING ENGINE OUTPUT TO SUPPRESS SLIPS ON WHEELS APPLICABLE TO AUTOMOTIVE VEHICLE

[75] Inventor: Takeo Akiyama, Tokyo, Japan
[73] Assignee: Nissan Motor Company, Ltd., Japan
[21] Appl. No.: 574,682
[22] Filed: Aug. 30, 1990
[30] Foreign Application Priority Data Sep. 5, 1989 [JP] Japan ............................ 1-230021

[51] Int. Cl.⁵ ............................................. B60K 41/20
[52] U.S. Cl. ............................ 364/426.02; 180/197; 123/336
[58] Field of Search ........................ 364/426.02, 426.03; 180/197; 123/399, 336

[56] References Cited

U.S. PATENT DOCUMENTS

| 4,637,487 | 1/1987 | Nakamura et al. | 123/336 |
| 4,685,547 | 8/1987 | Ohashi et al. | 180/197 |
| 4,722,411 | 2/1988 | Ohashi et al. | 180/197 |
| 4,736,728 | 4/1988 | Takahashi et al. | 180/197 |
| 4,845,622 | 7/1989 | Suzuki et al. | 364/426.04 |
| 4,951,208 | 8/1990 | Etoh | 180/197 |

FOREIGN PATENT DOCUMENTS 62-45944 2/1987 Japan .

Primary Examiner—Gary Chin
Attorney, Agent, or Firm—Lowe, Price, LeBlanc & Becker

[57] ABSTRACT

A system and method for controlling engine output applicable to an automotive vehicle are disclosed in which when an engine output control condition is not satisfied and a predetermined follow-up control release condition is not satisfied, a second throttle valve additionally installed in series with a first throttle valve associated with an accelerator is controlled so as to follow up the angular displacement (opening angle) of the first throttle valve. Therefore, a sticking of the second throttle valve due to adhering or freezing of rust or foreign matters thereonto can be prevented. In addition, the follow-up control of the second throttle valve permits the second throttle valve to be displaced in a low opening angle required for the engine output reduction control in a short period of time. Thus, a responsive characteristic of reducing a slip rate on drive wheels can be improved. When the follow-up throttle valve is returned toward its fully open position. Thus, a durability of a second throttle valve actuator can be enhanced. The second throttle valve, therefore, does not provide an intake air resistance and/or turbulence for the engine intake air.

10 Claims, 6 Drawing Sheets

SYSTEM AND METHOD FOR CONTROLLING ENGINE OUTPUT TO SUPPRESS SLIPS ON WHEELS APPLICABLE TO AUTOMOTIVE VEHICLE

BACKGROUND OF THE INVENTION (1) FIELD OF THE INVENTION

The present invention relates to a system and method for controlling engine output to suppress wheel slip which are applicable to an automotive vehicle.

According to the present invention, the engine output controlling system includes, in addition to a first throttle valve linked with an acceleration element, a second throttle valve which is externally controllable. Engine output is controlled by actuating to open and close the second throttle valve to suppress slips occurring on drive wheels.

(2) BACKGROUND ART

Japanese patent application First Publication (Unexamined) No. Showa 62-45944 published on Feb. 7, 1987 exemplifies a previously proposed system for controlling engine output to suppress drive wheel slippage.

In the previously proposed system, another (second) throttle valve which is externally controllable is installed within a throttle chamber of an intake air passage of a vehicular engine in series with the usual (first) throttle valve which is linked to the accelerator pedal.

During occurrence of slippage affecting drive wheels, the second throttle valve is controlled in three modes, i.e., fully open, hold, and fully closed, according to situations (,e.g., magnitude) in which drive wheel slippage occurs. Then, a control system for the second throttle valve, independent of the acceleration system including the first throttle valve, controls an opening angle of the second throttle valve to reduce engine output (torque) so as to suppress drive wheel slippage.

In addition, when the engine output reduction control condition is not satisfied, i.e., the engine output is not controlled, the opening angle of the second throttle valve is made in accordance with that of the first throttle valve, i.e., is controlled so as to follow-up the opening angle of the first throttle valve, i.e., 1:1.

Therefore, in a case where engine output reduction control is not carried out for a longer period of time or for a longer duration of time, a sticking of the second throttle valve due to a clogging of fuel in the throttle chamber or adhering foreign matters or so on thereon can be prevented.

On the other hand, since the engine output reduction control is resumed a short period of time after the end of the engine output reduction control, the second throttle valve can be returned in a very short period of time toward a predetermined narrow opening angle and responsive characteristic of reducing a slip rate of drive wheels can be improved.

However, the previously proposed system described above has the following problems since the opening angle of the second throttle valve always follows up that of first throttle valve.

(1) an actuator installed for opening and closing the second throttle valve has lesss durability.

(2) the second throttle valve arranged in the intake passage in series with the first throttle valve provides an intake air resistance for the engine intake air and a turbulence of the engine intake air is produced.

It is noted that if the second throttle valve provides intake air resistance for the engine intake air and the turbulence is generated in the intake air, the engine output corresponding to an accelerator operating variable does not appear. In addition, The follow-up control of the second throttle valve has an ill effect such as to delay the engine output responsive characteristic for a change in the operation of accelerator. For example, in a case where a bypass intake air passage for EGR is installed upstream of the second throttle valve, an excessive lack in a flow quantity through the bypass intake air passage for EGR is generated.

SUMMARY OF THE INVENTION

It is an object of the present invention to provide a system and method for controlling an engine output applicable to an automotive vehicle having tandem throttles of a first and second throttle valves in which the first throttle valve is controlled in accordance with an operating variable of an accelerator, a second throttle valve is controlled through an actuator, a sticking of the second throttle valve to a wall of a throttle chamber can be prevented, a responsive chracteristic of reducing a slip rate on drive wheels and a durability of an actuator can be improved, and a relief of affecting the installation of the second throttle valve on an engine intake air can be achieved.

The above-described object can be achieved by providing a system for controlling an engine output to suppress drive wheel slippage applicable to an automotive vehicle, comprising: a) a first engine driving force adjusting mechanism installed within an engine intake passage and interlocked with an accelerator of the vehicle; b) a second engine driving force adjusting mechanism installed in series with the first engine driving force adjusting mechanism; c) an actuator for actuating the second engine driving force adjusting mechanism; d) first means for detecting slip conditions of wheels to which the engine output driving force is transmitted; e) second means for determining whether a predetermined control condition including wheel slip information is satisfied; f) third means for outputting a control command to the actuator when the predetermined engine output condition is satisfied, the control command being output to the actuator so that an actuation of the second driving force adjusting mechanism causes the engine output to be reduced; g) fourth means for detecting a first operating variable of the first engine driving force adjusting mechanism; h) fifth means for detecting a second operating variable of the second driving force adjusting mechanism; and i) sixth means for following up the second operating variable of the second engine driving force adjusting mechanism so as to make the second operating variable of the second engine driving force adjusting mechanism coincide with the first operating variable of the first engine driving force adjusting mechanism when the engine output control condition is not satisfied and for outputting another control command to the actuator so that the second operating variable of the second engine driving force adjusting mechanism is returned toward its zero position when a predetermined follow-up control release condition is satisfied.

The above-described object can also be achieved by providing a system applicable to an automotive vehicle, comprising: a) a first throttle valve installed within an engine intake air passage and interlocked with an accelerator of the vehicle; b) a second throttle valve additionally installed in series with the first throttle valve which is normally open but which is controlled independently of the first throttle valve when a slip suppression control is carried out; c) an actuator for actuating the second throttle valve; d) first means for detecting slip conditions of wheels to which the engine output is transmitted; e) second means for establishing a predetermined control condition of the slip suppression control according to the slip conditions and determining whether the predetermined control condition is satisfied; f) third means for outputting a control command to the actuator to actuate the second throttle valve to suppress slippage of the wheels, the control command being output to the actuator when the predetermined control condition is satisfied so that an actuation of the second throttle valve causes the engine output to be reduced; g) fourth means for detecting a first opening angle of the first throttle valve; h) fifth means for detecting a second opening angle of the second throttle valve; i) sixth means for establishing a predetermined follow-up control condition, determining whether the predetermined follow-up control condition is satisfied, and following up the second opening angle of the second throttle valve when the predetermined follow-up control condition is satisfied so as to make the second opening angle of the second throttle valve coincide with the first opening angle of the first throttle valve; and j) seventh means for establishing a predetermined follow-up control release condition, determining whether the predetermined follow-up control release condition is satisfied, and outputting another control command to the actuator when the predetermined follow-up control release condition is satisfied so that the second throttle valve is returned toward its fully open position.

The above-described object can also be achieved by providing a method for controlling an engine output applicable to an automotive vehicle, comprising the steps of: a) providing a first throttle valve installed within an engine intake passage and interlocked with an accelerator of the vehicle; b) providing a second throttle valve additionally installed in series with the first throttle valve which is normally open but which is controlled independently of the first throttle valve when a slip suppression control is carried out; c) providing an actuator for actuating the second throttle valve; d) detecting slip conditions of drive wheels to which the engine output is transmitted; e) establishing a predetermined control condition of the slip suppression control according to the slip conditions and determining whether the predetermined control condition is satisfied; f) outputting a control command to the actuator to actuate the second throttle valve to suppress slippage of the wheels, the control command being output to the actuator when the predetermined control condition is satisfied so that an actuation of the second throttle valve causes the engine output to be reduced; g) detecting a first opening angle of the first throttle valve; h) detecting a second opening angle of the second throttle valve; i) establishing a predetermined follow-up control condition, determining whether the predetermined follow-up control condition is satisfied, and following up the second opening angle of the second throttle valve when the predetermined follow-up control condition is satisfied so as to make the second opening angle of the second throttle valve coincide with the first opening angle of the first throttle valve; and j) establishing a predetermined follow-up control release condition, determining whether the predetermined follow-up control release condition is satisfied, and outputting another control command to the actuator when the predetermined follow-up control release condition is satisfied so that the second throttle valve is returned toward its fully open position.

DETAILED DESCRIPTION OF THE PREFERRED EMBODIMENT

Reference will hereinafter be made to the drawings in order to facilitate a better understanding of the present invention.

Figure 1:
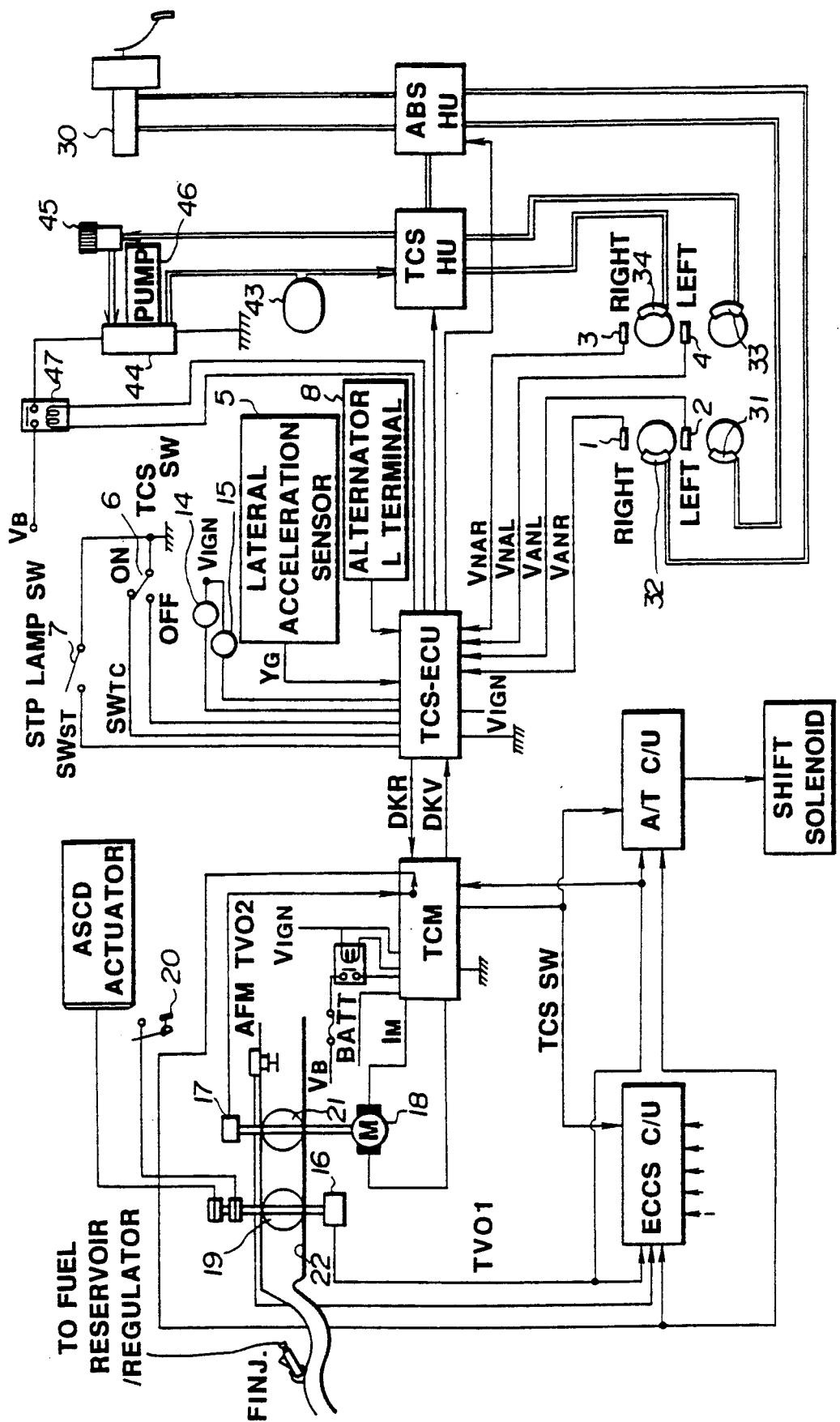
FIG. 1 is a schematic block diagram of a system for controlling engine output for an automotive vehicle applicable to a rear wheel drive vehicle in a preferred embodiment according to the present invention.

FIG. 1 shows a preferred embodiment of a vehicular system for controlling engine output according to the present invention applicable to a control system for a controlled drive system in a rear wheel drive vehicle (FR).

In FIG. 1, a throttle control system (corresponding to a vehicle engine output control system) is shown which controls an opening angle of an engine throttle valve so that a slip rate of rear drive wheels falls in an optimum allowable range, also shown is a brake control system which automatically provides a braking force for one of the left and/or right drive wheels, whichever is about to slip, and an anti-skid brake system (ABS) which carries out the front and rear wheel brake liquid pressure controls in a way so as to prevent wheel locks during abrupt braking. These elements are installed as a traction concentrated control system.

Peripheral systems of the traction concentrated control system include an airflow meter AFM, an engine concentrated electronic control unit (ECCS C/S), and fuel injector F INJ. In addition, the ECCS C/U executes control of fuel injection quantity and injection timing, ignition timing, engine revolution speed during idling. Further included are an automatic transmission control unit A/T C/U and shift solenoid, which carry out gear shift range change control and a lock-up control of an automatic transmission, a shift solenoid and an automatic cruise speed controlling system (ASCD) which control vehicle speed at a desired cruise speed.

Controls related to the traction control carried out using tandem throttle valves which include a select low control such that when a traction switch signal TCS SW is output, indicating that traction control is being carried out, a first throttle signal TV01, and second throttle signal TV02 are received in the ECCS C/U, the signal indicating an opening angle which is narrower than that of the first and second throttle valves is selected in the ECCS C/U and automatic transmission control system (A/T C/U). In addition, in the automatic cruise speed controlling system (ASCD), the automatic speed control is inhibited by the ASCD when the traction control switch signal TCS SW is received.

A structure of the automatic cruise controlling system is exemplified by a U.S. Pat. No. 4,845,622 issued on Jul. 4, 1989, the disclosure of which is hereby incorporated by reference.

The structure of the traction concentrated control system will be described below.

In traction control such that the engine driving force is reduced, in order to achieve the most stable vehicle run with high traction under various driving conditions, throttle control by means of the engine throttle valve opening angle controlling system, independent right-and-left rear wheel controls by means of the brake control system, and electronic control of both the opening angle, brake, and anti-skid brake control are executed by a traction control system electronic control unit TCS-ECU (hereinafter abbreviated as TCS-ECU).

The TCU-ECU receives: a right front wheel speed $V_{ANR}$ derived from a right front wheel speed sensor 1; a left front wheel speed $V_{ANL}$ derived from a left front wheel speed sensor 2; a right rear wheel speed $V_{NAR}$ derived from a right rear wheel speed sensor 3; a left rear wheel speed $V_{NAL}$ derived from a left rear wheel speed sensor 4; a lateral acceleration $Y_G$ derived from a lateral acceleration sensor 5; a switch signal $SW_{TC}$ derived from a TCS switch 6; a switch signal $SW_{ST}$ derived from a brake lamp switch 7; an actual opening angle DKV of the first throttle valve derived from a throttle control module TCM; and an output (engine revolution speed monitor) derived from an alternator (L) terminal 8.

A target opening angle DKR of the second throttle valve 2 is derived from a Throttle Control Module (hereinafter, referred to as a TCM) in order to carry out engine throttle valve opening angle control during occurrence of slips on one or both of the drive wheels.

For the anti-skid braking system hydraulic unit ABS-HU, and the traction control system hydraulic unit TCS-HU a control command is output to solenoid valves 9, 10 for the respective rear wheels in order to execute the rear wheel hydraulic control during occurrence of drive wheel slip. Furthermore, during abrupt braking operation, in order to execute the anti-skid brake control, a control command is issued to a solenoid valve 13 for the right and left rear wheels and to solenoid valves for the front wheels.

It is noted that the control unit TCS-ECU outputs a turn on command to the TCS fail lamp 14 if TCS failure occurs. During TCS operation, a turn on command is issued to turn on a TCS operation indicating lamp 15.

The TCM control circuit includes a throttle motor drive circuit, receiving a first throttle signal TV01 from the first throttle valve opening angle sensor 16, outputting an actual opening angle DKV of the first throttle valve to the TCS-ESU, inputting the opening angle signal TVG02 of the second throttle valve derived from the second throttle sensor 17 as feedback information for the target opening angle DKR of the second throttle valve, and supplying a motor drive current $I_w$ to a throttle motor 18 on the basis of a target opening angle DKR of the second throttle valve from the TCS-ECU.

The first throttle valve 19 installed on the first throttle sensor 16 is a valve operated in cooperation with an accelerator pedal 20. The second throttle valve 21 installed on a second throttle sensor 17 is installed in an engine intake passage 22 in series with the first throttle valve 19 and opened and closed by means of the throttle motor 18.

Figure 2:
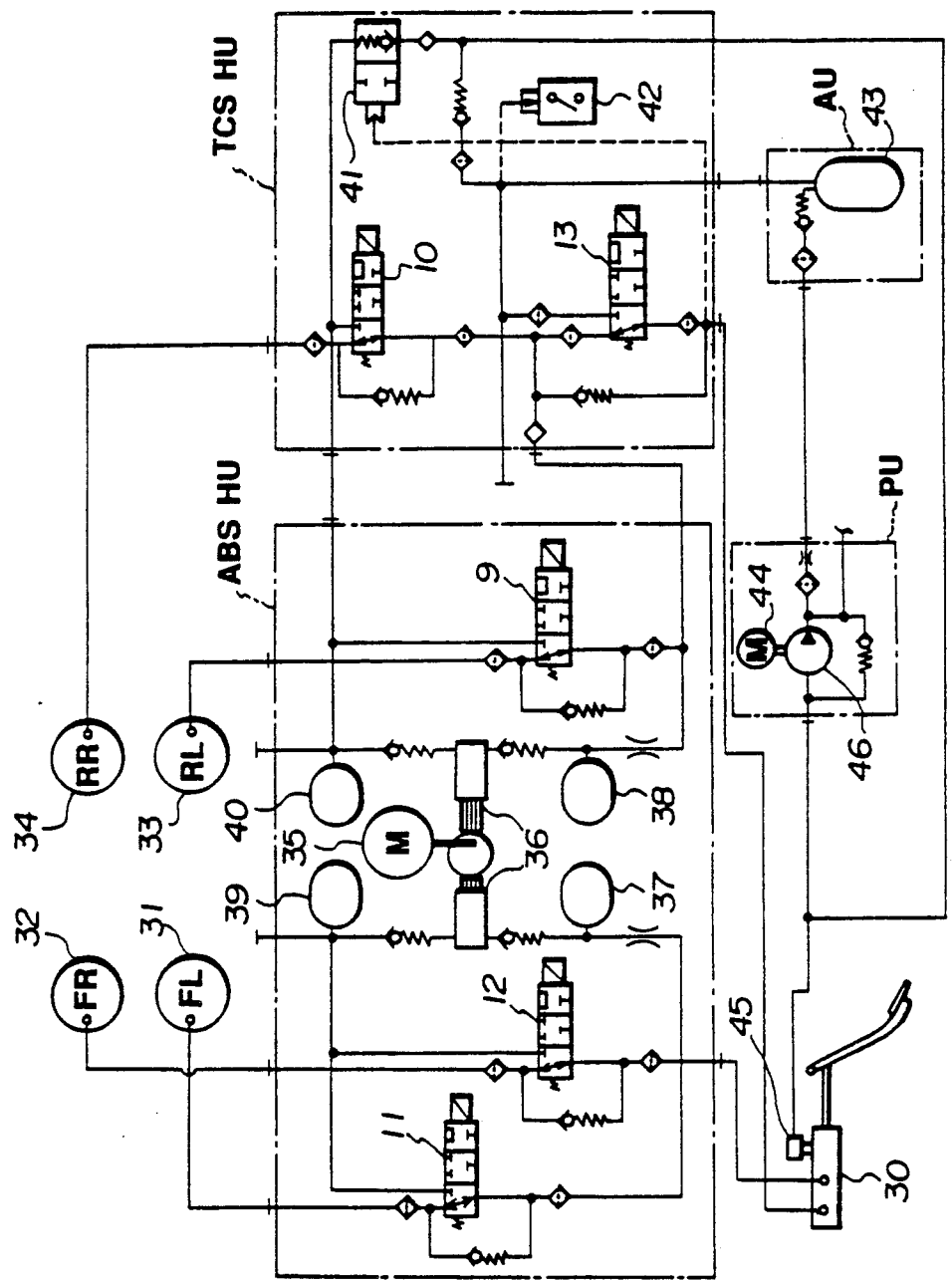
FIG. 2 is a schematic hydraulic circuit block diagram of a brake fluid pressure control system in the preferred embodiment shown in FIG. 1.

FIG. 2 shows a hydraulic circuit diagram of a brake fluid pressure control system functioning the left-right rear wheel independent brake control system and anti-skid brake control system.

A traction control system hydraulic unit TCS-HU, an accumulator unit AU, and pump unit PU are added to a well-known anti-skid brake system hydraulic unit ABS-HU installed midway along an oil path between a brake master cylinder 30 and each wheel cylinder 31, 32, 33, and 34.

The ABS-HU includes a motor 35, pump 36, accumulators 37, 38, reservoir tanks 39, 40, left front wheel solenoid valve 11, right front wheel solenoid valve 12, and a left rear wheel solenoid valve 9 for the left rear wheel TCS.

The TCS-HU includes an ABS-TSC switch valve 41, a solenoid valve 10 for the right rear wheel TCS, a solenoid valve 13 for the left and right rear wheel (ABS), and a hydraulic switch 42.

The accumulator unit AU includes a gas piston accumulator 43 having an inner wall being doubly and hermetically sealed. The pump unit PU is provided with a pump 46 supplying operating oil from the reservoir tank 45 which is also attached to a master cylinder 30.

Figure 3:
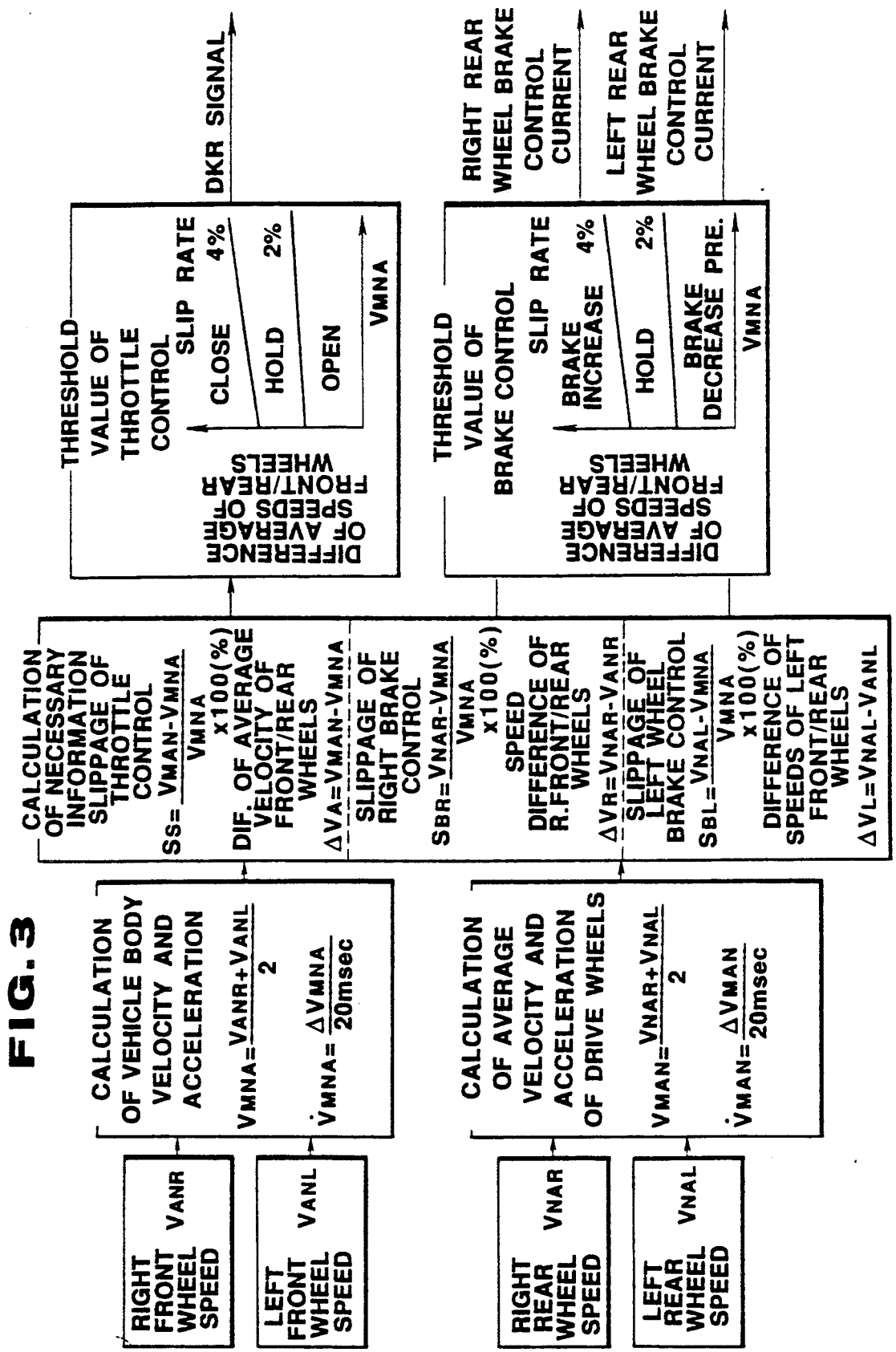
FIG. 3 is an explanatory block diagram indicating a basic traction control operation.

In addition, during anti-skid brake control operation, the ABS-TCS switch valve 41 operating the brake fluid pressure for the rear wheels from the master cylinder 30 as a signal pressure is closed. In addition, the solenoid valves 9 and 10 for the right and left rear wheels TCS are fixed at a pressure increased position, as shown in FIG. 3.

In this state, an operation control for the left front wheel solenoid valve 11, right front wheel solenoid valve 12, and right-and-left rear wheel ABS is carried out in response to an external command.

In addition, during right and left rear wheel independent brake control operations, the motor is driven and controlled in accordance with a motor relay 47 which turns ON and OFF in cooperation with a pressure switch. Operating oil under a predetermined pressure is maintained in a gas piston accumulator 43. Each of the solenoid valves 9 and 10 for the right and left rear wheels TCS is controlled in response to an external command.

Next, operation of the traction concentrated control will be described below.

(1) Basic Traction Control

FIG. 3 shows a block diagram indicating a basic traction control operation from a point of time at which a control start condition is satisfied in the TCS-ESU to a point of time at which a control end condition is satisfied.

Required control information is derived by calculation on the basis of the signals from the respective wheel speed sensors 1, 2, 3, and 4.

By comparison of a throttle control threshold value map previously set, a brake control threshold map, and the control information, a DKR signal is output which controls the second throttle valve 21 in either of three modes, open, closed, and hold. A brake control current is output, for the respective left and right rear wheels, which is used to control the brake fluid pressure in any one of, pressure increase, hold, or pressure decrease conditions.

Figure 4:
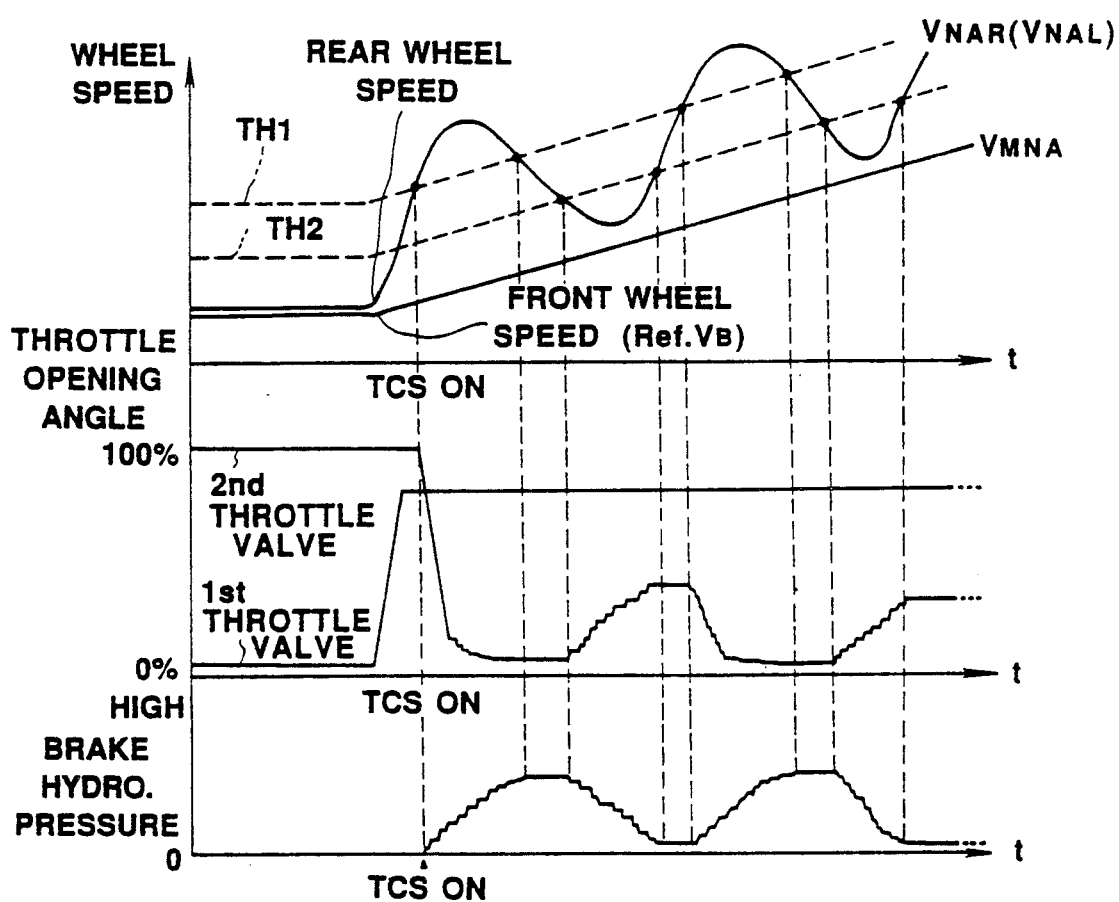
FIG. 4 is a signal timing chart of the basic traction control operation shown in FIG. 3.

FIG. 4 is a timing chart of an intermediate acceleration during which the basic traction control generates a rear wheel slip due to an abrupt depression of the accelerator.

(2) Throttle control

Figure 5:
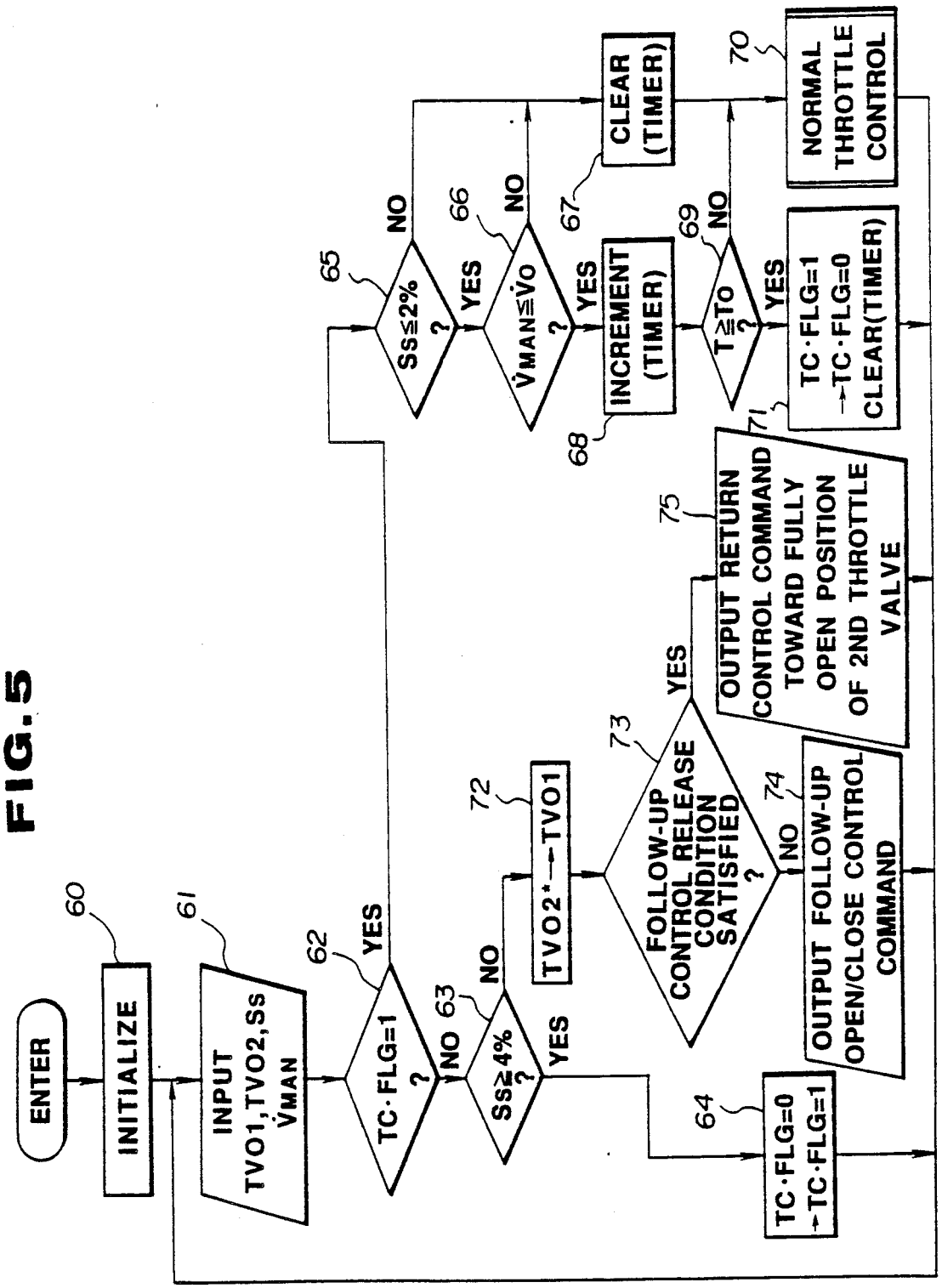
FIG. 5 is an operational flowchart of output signals at respective portions of the system shown in FIG. 1 during a second throttle control operation.

FIG. 5 is an operational flowchart indicating a throttle control operation carried out in the TCS-ECU and TCM.

In a step 60, initialization processing (for example, TC·FLG=0, a timer value T is cleared) is carried out.

Required control information, such as a first throttle signal TV01 and a second throttle signal TV02, the first throttle signal TV01 and second throttle signal TV02 indicating actual opening angles of the first and second throttle valves 19 and 21, is output.

In a step 62, a control unit of the TCS-ECU and TCM (hereinafter referred to only as control unit) determines whether the second throttle valve is controlled (TC·FLG=1) or uncontrolled (TC·FLG=0) from a flag of TC·FLG.

In a step 63, the control unit determines whether a slip rate $S_S$ for the throttle control is above 4%. That is to say, a start condition for throttle control is that a slip rate of a throttle control $S_S$ is $S_S \geq 4\%$. When both conditions are satisfied, the routine goes to a step 64 in which TC·FLG is set to 1.

If TC·FLG=1 in the step 62, the routine goes to a step 65 in which it is determined if a slip rate $S_S$ of the second throttle control is $S_s \leq 2\%$. In the next step 66, the control unit determines whether the rear wheel acceleration $\dot{V}_{MAN}$ is below the set acceleration $\dot{V}_o$.

When both of the steps 65 and 66 are satisfied, the routine goes to a step 68. If the timer value T is incremented and the routine goes to a step 69. Then, the control unit determines whether a timer value T exceeds a set timer value $T_o$ in a step 69.

That is to say, if the slip rate $S_s$ for the throttle control is $S_s \leq 2\%$ and a condition under a state in which the rear wheel acceleration $\dot{V}_{MAN}$ is $\dot{V}_{MAN} \leq \dot{V}_o$ is continued only for a set duration of a timer value $T_o$ an end condition for the throttle control is satisfied. When the end condition is satisfied, the routine goes to a step 71 in which TC·FLG is set from 1 to 0 and a timer value T is cleared.

In addition, when the end condition is satisfied from the start of second throttle valve control, the routine goes to a step 70 in which normal control of the second throttle valve is carried out in the way described according to the basic traction control operation.

On the other hand, if the slip rate $S_s$ of the second throttle control is a step 63 is determined to indicate $S_s < 4\%$, no control operation is initiated for the second throttle valve 21 (TC·FLG=0) and the routine goes to a return control processing step after a step 72.

In the step 72, a target opening angle TV02* of the second throttle valve 21 is set in the following formula:
TV02* = TV01

In a step 73, the control unit determines whether a follow-up control release condition of the second throttle valve 21 is satisfied.

It is noted that the follow-up control release condition includes, e.g., when an ignition switch is turned to OFF, when a predetermined time has elapsed upon completion of control, when rain water droplets have not been perceived at an outer air temperature above 5° C. The follow-up control release condition is determined from a combination or any one of the conditions described above.

If the follow-up control release condition is not satisfied, the routine goes to a step 74 in which a follow-up open/close control command to make the opening angle of the second throttle valve 21 coincide with that of the first throttle valve 19 is produced.

If the follow-up control release condition is satisfied, the routine goes to a step 75 in which a command for the second throttle valve 21 to return toward its fully open position.

Hence, the following features are provided in the return control procedure of the second throttle valve 21.

When the predetermined follow-up control release condition is not satisfied, the second throttle valve 21 is controlled to follow up the first throttle valve 19. Therefore, the sticking of the second throttle valve 21 due to attaching of rust and foreign matters thereto and due to freezing thereof can be prevented.

(2) In a case where the engine output reduction control is resumed immediately after the second throttle valve control is ended, the follow-up control of the second throttle valve 21 causes the opening angle of the second throttle valve 21 to be reduced toward a low opening angle required for the second throttle valve 21 for a very short period of time $t_s$, thereby improvement of reducing the slip rate being achieved.

Figure 6:
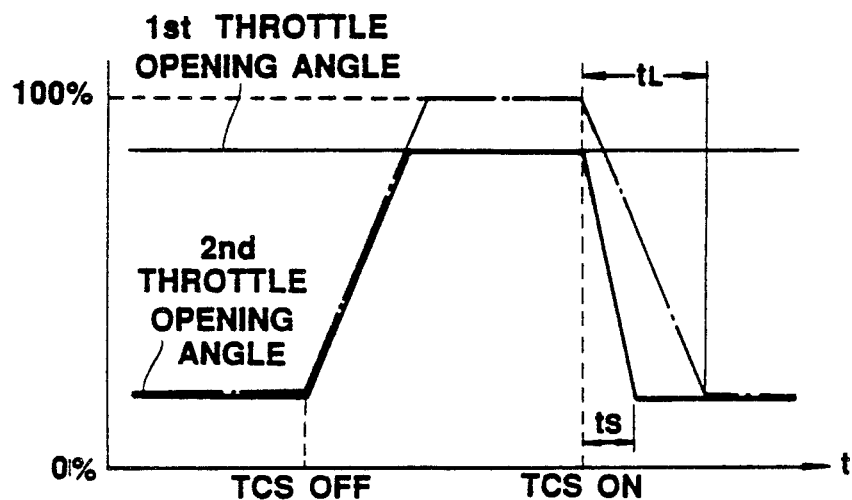
FIG. 6 is a timing chart of a second throttle opening angle characteristic in a case where another throttle control is resumed immediately after a previous throttle control is ended.

It is noted that in a case where the opening angle of the second throttle valve is returned toward the fully open position after the end of the second throttle valve control, a longer period of time $t_L$ is required during which the opening angle of second throttle valve 21 is returned toward the low (narrow) opening angle required to carry out the engine reduction control through the second throttle valve at the time when the engine output reduction control is resumed, as denoted by a dot-and-dash line of FIG. 6.

Figure 7:
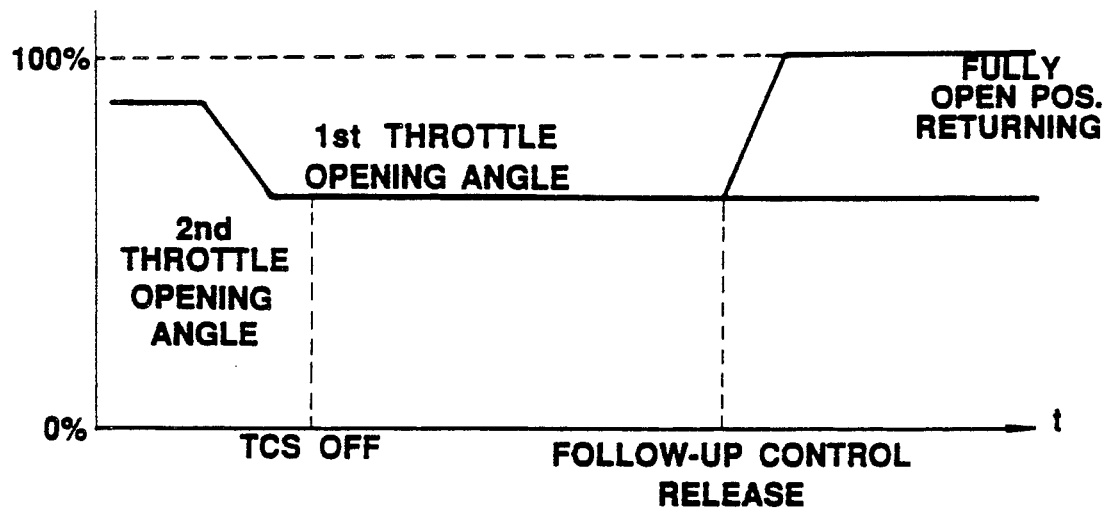
FIG. 7 is a timing chart of a throttle opening angle characteristic in a case where a follow-up control release condition is satisfied after the second throttle control is ended.

(3) Since the second throttle valve 21 is not always under the follow-up control but is returned toward its fully open position when the predetermined follow-up control release condition is satisfied, as denoted by a solid-line characteristic of FIG. 7, the second throttle motor 18 can be held in a halt state and thereby a durability of the engine can be improved.

(4) Since the second throttle valve 21 is returned toward its fully open position when the predetermined follow-up control release condition is satisfied, the second throttle valve 21 arranged in the intake air passage 21 in series with the first throttle valve 19 does not always provide the intake air resistance and does not generate the turbulence in the engine intake air. Consequently, an influence of the intake air resistance and turbulence in the engine intake air on the engine output can be relieved. In addition, in a case where the bypass passage for EGR (Exhaust Gas Recirculation) is, e.g., installed at the upstream side of the second throttle valve, the influence such that the excessive lack of the flow quantity of intake air through the bypass intake air passage can be relieved.

As described hereinabove, in the engine output control system having tandem throttles including first and second throttle valves applicable to automotive vehicles according to the present invention, the second throttle valve follows up the first throttle valve when the engine output control condition is not satisfied and when it is satisfied the second throttle valve is returned toward its fully open position. Therefore, the engine output controlling system and method of the invention can prevent the sticking of the second throttle valve to a wall of the intake air passage, since the second valve is always moved together with the first throttle valve. Such sticking of the second valve to the wall frequently occurs when the second throttle valve does not move except when the traction control uses that valve. Further, the inventive structure can improve the converging responsive characteristic of apparatus for reducing the slip rate of drive wheels by positioning the second throttle valve in a very short time at a low opening angle required for the engine output control. When the opening angle control over the second throttle valve is resumed immediately after ending of the engine output control, due to the follow-up control of the second throttle valve. Further, the invention can improve the durability of the valve actuator for driving the second throttle valve to open or close. The improvement is attained because the second throttle valve is not always follow-up controlled. Indeed, when the predetermined follow-up release condition is satisfied the second throttle valve is returned to the full open state and the durability is improved since the valve actuator is not always in the operating state or in the load applying transient state. Finally, since the follow-up control of the second throttle valve means that both the first and second throttle valves are displaced with the same opening angles, and since the second throttle valve is arranged in series with the first throttle valve, the second throttle valve does not always provide an intake air resistance or disturbance for the engine intake air, thus relieving the influence on the engine intake air.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for controlling an engine output to suppress drive wheel slippage applicable to an automotive vehicle, comprising:
   a) a first engine driving force adjusting mechanism installed within an engine intake passage and interlocked with an accelerator of the vehicle;
   b) a second engine driving force adjusting mechanism installed in series with the first engine driving force adjusting mechanism;
   c) an actuator for actuating the second engine driving force adjusting mechanism;
   d) first means for detecting slip conditions of wheels to which the engine output driving force is transmitted;
   e) second means for determining whether or not a predetermined engine output control condition including wheel slip information is satisfied;
   f) third means for outputting a control command to the actuator when the predetermined engine output control condition is satisfied, the control command being output to the actuator so that an actuation of the second driving force adjusting mechanism causes the engine output to be reduced;
   g) fourth means for detecting a first operating variable of the first engine driving force adjusting mechanism;
   h) fifth means for detecting a second operating variable of the second driving force adjusting mechanism; and
   i) sixth means for providing follow-up control of the second operating variable of the second engine driving force adjusting mechanism so as to make the second operating variable of the second engine driving force adjusting mechanism coincide with the first operating variable of the first engine driving force adjusting mechanism when the predetermined engine output control condition is not satisfied and for outputting another control command to the actuator so that the second operating variable of the second engine driving force adjusting mechanism is returned toward zero when a predetermined follow-up control release condition is satisfied.

2. A system as set forth in claim 1, wherein the automotive vehicle has four wheels, the rear wheels thereof being driven from the engine output, and wherein the first means included seventh means for detecting a right front wheel (right compliance wheel) speed $V_{ANR}$; eight means for detecting a left front wheel (left compliance wheel) speed $V_{ANL}$; ninth means for detecting a right rear wheel (right drive wheel) speed $V_{NAR}$; tenth means for detecting a left rear wheel (left drive wheel) speed $V_{NAL}$; eleventh means for calculating an average speed $V_{MAN}$ of the drive wheels and an acceleration $\dot{V}_{MAN}$ thereof as follows: $V_{MAN}=(V_{NAR}+V_{NAL})/2$, and $\dot{V}_{MAN}=\Delta V_{MAN}/20$ msec.; twelfth means for calculating a vehicle body speed $V_{MNA}$ and an acceleration $\dot{V}_{MNA}$ thereof as follows: $V_{MNA}=(V_{ANR}+V_{ANL})/2$, and $\dot{V}_{MNA}=\Delta V_{MNA}/20$ msec.; and thirteenth means for calculating a slip rate $S_s$ of the drive wheels used to control the second engine driving force adjusting mechanism as follows: $S_s=(V_{MAN}-V_{MNA})/V_{MNA}\times 100(\%)$.

3. A system as set forth in claim 2, wherein the predetermined engine output control condition is such that said slip rate ($S_s$) of the drive wheels is equal to or above 4%.

4. A system as set forth in claim 3, which further comprises a timer which counts a time T when the slip rate of the drive wheels is equal to or below 2% ($S_s \leq 2\%$) and the acceleration $\dot{V}_{MAN}$ of the drive wheels is equal to or below a predetermined acceleration $\dot{V}_o$ and wherein an end of said predetermined engine output control condition is defined as a condition wherein the timed value T of the timer exceeds a predetermined time $T_o$.

5. A system as set forth in claim 4, wherein the sixth means outputs the other control command to the actuator when the follow-up control release condition is not satisfied and the slip rate of the drive wheels is expressed as follows: $S_s < 4\%$.

6. A system as set forth in claim 5, which further includes seventh means for establishing the predetermined follow-up control release condition and determining whether the predetermined follow-up control release condition is satisfied, the predetermined follow-up release condition being any one or each of determinations of whether a vehicular engine ignition switch is turned off, whether the vehicle has run a predetermined running distance after the follow-up control is ended, and whether a predetermined time has elapsed after the follow-up control is ended.

7. A system as set forth in claim 6, wherein the first and second operating variables are opening angles of first and second throttle valves and the system control of engine output to suppress drive wheel slippage is such that the opening angle of the second throttle valve is adjusted in three modes, open, closed and hold, according to an average speed difference of the front and rear wheels, vehicle body speed ($V_{MNA}$) and slip rate of the drive wheels ($S_s$).

8. A system applicable to an automotive vehicle, comprising:
   a) a first throttle valve installed within an engine intake air passage and interlocked with an accelerator of the vehicle;
   b) a second throttle valve additionally installed in series with the first throttle valve which is normally open but which is controlled independently of the first throttle valve when a slip suppression control is carried out;
   c) an actuator for actuating the second throttle valve;
   d) first means for detecting slip conditions of wheels to which the engine output is transmitted;
   e) second means for establishing a predetermined control condition of the slip suppression control according to the slip conditions and determining whether the predetermined control condition is satisfied;
   f) third means for outputting a control command to the actuator to actuate the second throttle valve to suppress slippage of the wheels, the control command being output to the actuator when the predetermined control condition is satisfied so that an actuation of the second throttle valve causes the engine output to be reduced;
   g) fourth means for detecting a first opening angle of the first throttle valve;
   h) fifth means for detecting a second opening angle of the second throttle valve;
   i) sixth means for establishing a predetermined follow-up control condition, determining whether the predetermined follow-up control condition is satisfied, and controlling the second opening angle of the second throttle valve when the predetermined follow-up control condition is satisfied so as to make the second opening angle of the second throttle valve coincide with the first opening angle of the first throttle valve; and
   j) seventh means for establishing a predetermined follow-up control release condition, determining whether the predetermined follow-up control release condition is satisfied, and outputting another control command to the actuator when the predetermined follow-up control release condition is satisfied so that the second throttle valve is returned toward its fully open position.

9. A system as set forth in claim 8, wherein the seventh means carries out the follow-up control so that the second opening angle of the second throttle valve coincides with the first opening angle of the first throttle valve when the follow-up control condition is not satisfied.

10. A method for controlling an engine output applicable to an automotive vehicle, comprising the steps of:
   a) providing a first throttle valve installed within an engine intake passage and interlocked with an accelerator of the vehicle;
   b) providing a second throttle valve additionally installed in series with the first throttle valve which is normally open but which is controlled independently of the first throttle valve when a slip suppression control is carried out;
   c) providing an actuator for actuating the second throttle valve;
   d) detecting slip conditions of drive wheels to which the engine output is transmitted;
   e) establishing a predetermined control condition of the slip suppression control according to the slip conditions and determining whether the predetermined control condition is satisfied;
   f) outputting a control command to the actuator to actuate the second throttle valve to suppress slippage of the wheels, the control command being output to the actuator when the predetermined control condition is satisfied so that an actuation of the second throttle valve causes the engine output to be reduced;
   g) detecting a first opening angle of the first throttle valve;
   h) detecting a second opening angle of the second throttle valve;
   i) establishing a predetermined follow-up control condition, determining whether the predetermined follow-up control condition is satisfied, and controlling the second opening angle of the second throttle valve when the predetermined follow-up control condition is satisfied so as to make the second opening angle of the second throttle valve coincide with the first opening angle of the first throttle valve; and
   j) establishing a predetermined follow-up control release condition, determining whether the predetermined follow-up control release condition is satisfied, and outputting another control command to the actuator when the predetermined follow-up control release condition is satisfied so that the second throttle valve is returned toward its fully open position.

* * * * *